May 5, 1970  J. VAN METEREN  3,510,012
TUBE BUNDLE HANDLING APPARATUS
Filed Aug. 15, 1968  2 Sheets-Sheet 2

INVENTOR.
J. van Meteren
BY
Marn & Jangarathis
ATTORNEYS

United States Patent Office 3,510,012
Patented May 5, 1970

3,510,012
TUBE BUNDLE HANDLING APPARATUS
Johannes Van Meteren, Roelofarendsveen, Netherlands, assignor to The Lummus Company, Bloomfield, N.J., a corporation of Delaware
Filed Aug. 15, 1968, Ser. No. 753,012
Int. Cl. B66f 1/00
U.S. Cl. 214—1                 6 Claims

ABSTRACT OF THE DISCLOSURE

Method of and portable apparatus for removing tube bundles from heat exchangers, the apparatus comprising a hydraulically actuated trolley which cooperates with a plurality of matched pins in support members to "walk" the tube bundle out of or into the heat exchanger shell.

Background

Those familiar with the problems related to the construction and maintenance of large equipment such as heat exchange apparatus, particularly the relatively larger apparatus normally associated with large scale chemical operating facilities, have long recognized the need for improved methods of and apparatus for equipment for passing a relatively long load substantially axially through a relatively small hole, e.g., for installing and removing heat exchanger tube bundles. Apparatus of this type should be reasonably portable, easy to operate, and capable of handling varied size tube bundles in a safe and efficient manner.

Heretofore, apparatus for installing and removing tube bundles from heat exchangers and like equipment have been heavy and cumbersome or where not so heavy and cumbersome, have been incapable of handling the tube load without a relatively high likelihood of damage to the tube bundle during handling.

Summary of the invention

The present invention, therefore, provides a new and improved method of handling tube bundles and a tube bundle handling apparatus. The apparatus is sufficiently light to be relatively portable, capable of handling tube bundles of varying sizes, and adequately strong to allow handling of tube bundles with a minimum of danger of damage to the equipment or injury to operating personnel.

One embodiment of an apparatus according to this invention may include a plurality of support members for operative attachment to the structure of a heat exchanger or the like, trolley means mounted for reciprocating movement in the support members and capable of being secured to the support members at a plurality of longitudinal positions along the length thereof, and power means mounted on the trolley means for displacing a tube bundle or similar load into or out of the heat exchanger as desired.

Brief description of the drawings

The eact nature of this invention with its attendant advantages will be more completely understood from a consideration of the following detailed description when read in the light of the attached drawings, wherein.

Detailed description

Figure 1:
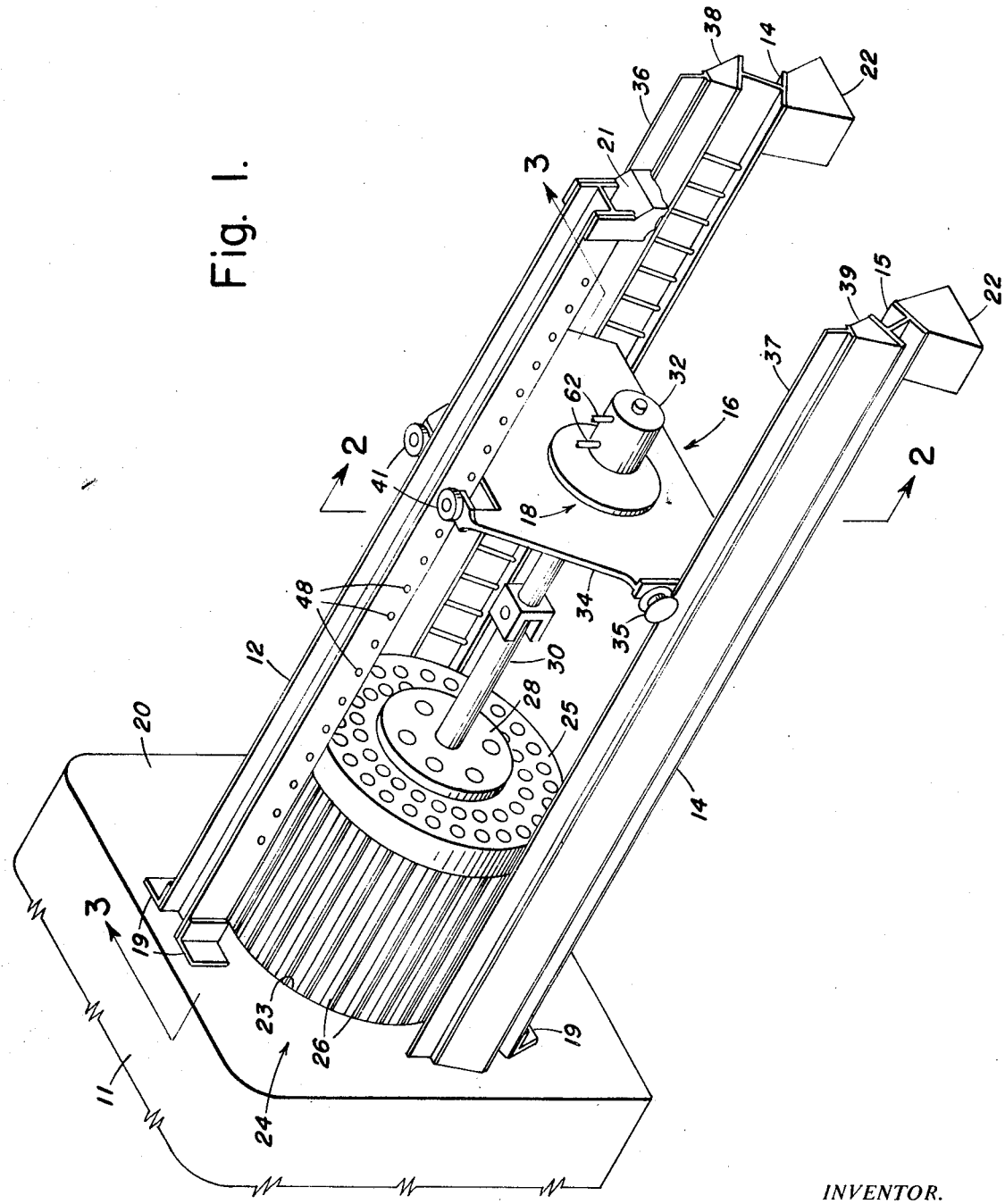
FIG. 1 is a perspective view, partially in section, of a tube bundle handling apparatus according to the present invention, shown in operating position for handling a tube bundle of a heat exchanger.

Referring now to FIG. 1, a tube handling apparatus according to the present invention, designated generally by the reference numeral 10, is shown operatively connected to a typical heat exchanger, designated generally by the reference numeral 11.

Tube handling apparatus 10 comprises a support cage including three equilaterally disposed I-beams 12, 14 and 15, a trolley, designated generally by the reference numeral 16, and a hydraulic power apparatus designated generally by the reference numeral 18.

The I-beams 12, 14 and 15 of the support cage are each secured at their one ends, by suitable means such as welding pads 19 and bolts, to a wall 20 of heat exchanger 11. At their other ends, i.e., the ends of the I-beams remote from heat exchanger 11, I-beams 12, 14 and 15 are secured together by a suitable plate 21, shown partially in FIG. 1, and supported by suitable foundation elements 22. As can be best seen in FIG. 2, I-beams 12, 14 and 15 are disposed equilaterally on the circumference of an imaginary circle having as its center the geometric central axis of trolley 16, the webs of each I-beam being tangent to the imaginary circle. It is to be recognized that while this arrangement of the I-beams is not critical, and that although other arrangements may be utilized with equivalent results, the disclosed arrangement has proven particularly useful when the tube bundles to be removed are relatively symmetrical. For reasons which will be discussed in detail hereinafter, there are mounted through and between the inner flanges of I-beams 12, 14 and 15, a plurality of longitudinally displaced keeper pins 48, 49 and 50 on each I-beam, respectively. Thus, typically, upper I-beam 12 is provided with spaced keeper pins 48 extending parallel to the plane of the I-beam web and through and between the I-beam flanges.

Provided in heat exchanger wall 20 is an access opening 23 wherethrough a tube bundle, designated generally by reference numeral 24, can be removed or installed. Tube bundle 24 is a typical tube bundle structure and includes a tube sheet 25 within and through which are mounted a plurality of heat exchanger tubes 26. Tubes 26 extend substantially normally with respect to the plane of heat exchanger wall 11 which is substantially parallel to the plane of tube sheet 25.

As is evident from FIG. 1, I-beams 14 are disposed equilaterally around access opening 23, with their longitudinal axes extending substantially parallel to the longitudinal axes of tubes 26. Thus, beams 14 are secured to, and extend normally outwardly from the outer surface of heat exchanger wall 20. It is to be understood, however, that there is no necessity for heat exchanger wall 20 to be a plane surface. When such is not the case, the I-beams 12, 14 and 15 are secured to the heat exchanger, or other suitable support structure, in such a manner as to provide the desired equilaterally spaced relationship of the I-beams around access opening 23 and the desired parallelism between the longitudinal axes of tubes 26, and the longitudinal axes of I-beams 14.

Tube bundle 24 is connected to tube handling apparatus 10 by a mounting plate 28 which is secured, as by bolts or other suitable means, in surface-to-surface contact with tube sheet 25. Mounting plate 28 is welded or otherwise secured to a jointed rod 30 which extends between the mounting plate 28 and a fluid motor 32 of hydraulic power apparatus 18. As will be discussed in greater detail, fluid motor 32, through jointed rod 30 and mounting plate 28, moves tube bundles 24 longitudinally inwardly or longitudinally outwardly of heat exchanger 11 depending upon whether the tube bundle 24 is to be inserted or removed from the heat exchanger.

Figure 2:
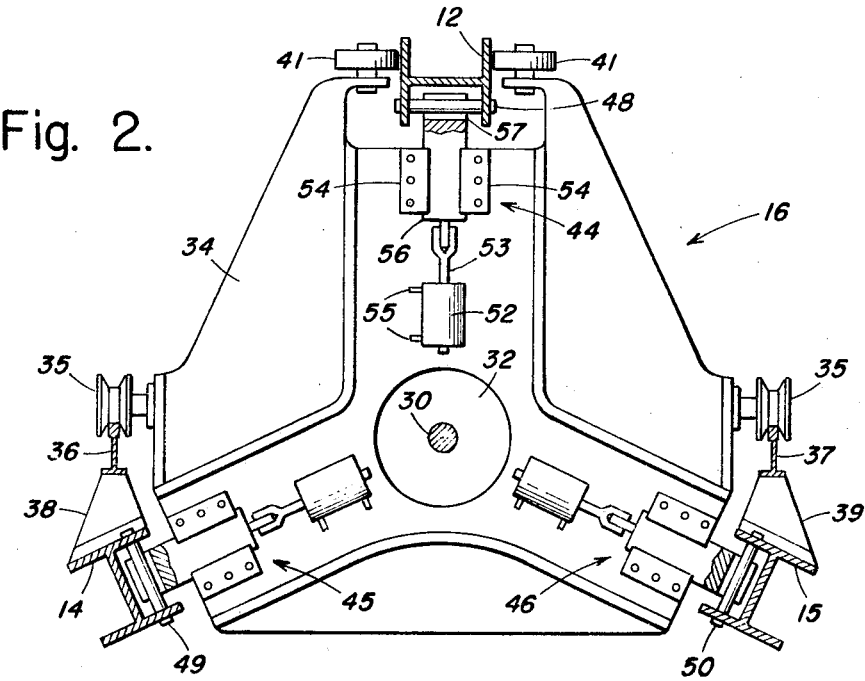
FIG. 2 is a cross-sectional view through the plane 2—2 of FIG. 1, in the direction of the arrows.
Figure 3:
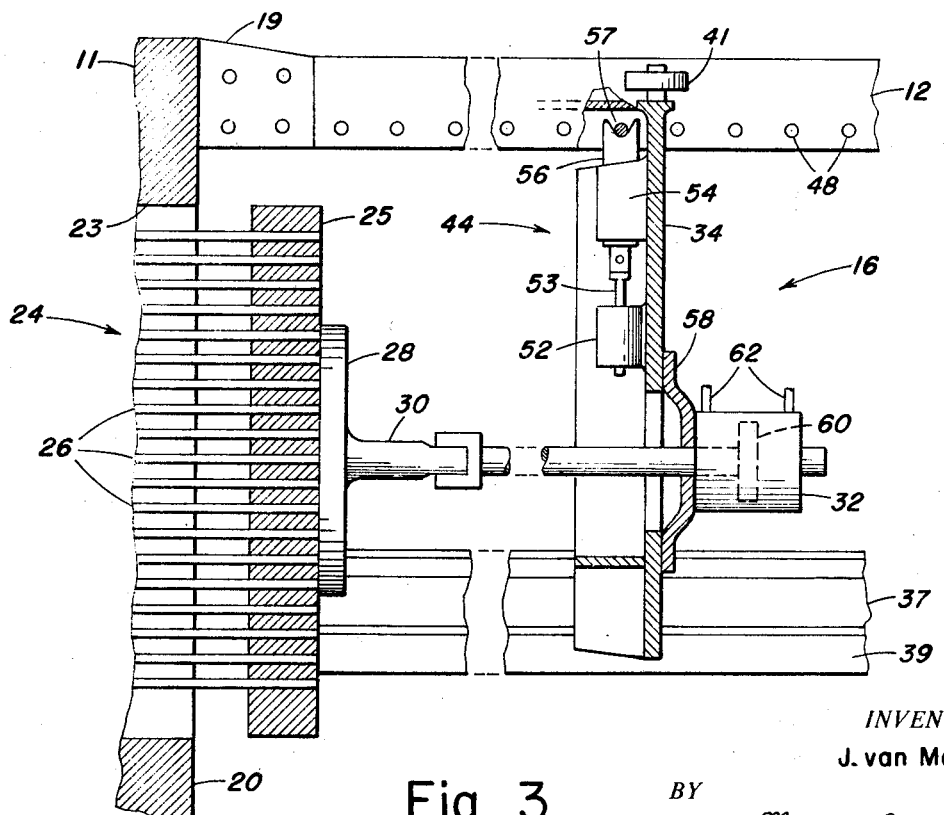
FIG. 3 is a cross-sectional view through the plane 3—3 of FIG. 1, in the direction of the arrows.

Referring now to FIGS. 2 and 3, trolley 16 can be seen to comprise a structural plate 34 having a pair of grooved wheels 35 mounted thereon for riding along spaced parallel tracks 36, 37. Tracks 36, 37 are mounted on pedestals 38, 39 which in turn are mounted on lower I-beams 14 and 15, respectively. Pedestals 38 and 39 are shaped so as to provide a horizontal bed for tracks 36, 37 notwithstanding the angular disposition of I-beams 14 and 15. Mounted on the upper edge of structural plate 34 are a pair of spaced guide wheels 41 which are mounted such as to contact the outer vertical surfaces of upper I-beam 12 to assist in guiding structural plate 34.

Mounted on structural plate 34 are three hydraulically operated locking mechanisms 44, 45 and 46. Locking mechanism 44 is mounted on the upper portion of plate 34 so as to operatively cooperate with any of the plurality of keeper pins 48 which are secured in upper I-beam 12. Locking mechanisms 45 and 46 are mounted adjacent lower I-beams 14 and 15, respectively, on structural plate 34, so as to operatively cooperate with any of a plurality of keeper pins 49, 50 which are secured in lower I-beams 14 and 15, respectively.

Locking mechanisms 44, 45 and 46 are identical. Thus, locking mechanism 44 will be described in detail as being typical of the structure of each of the others. More particularly, locking mechanism 44 comprises a fluid motor 52 connected through suitable hydraulic lines 55 to a hydraulic control system (not shown), which fluid motor operates to reciprocate a rod 53 radially outwardly or inwardly, as desired. Slidably secured to plate 34 by channels 54, and operably connected to rod 53, is locking bolt 56 which, as can be best seen in FIG. 3, is provided with a groove 57 on its outer surface for lockingly engaging keeper pin 48. Thus, it can be seen that fluid motor 52 is operable to extend locking bolt 56 outwardly into locking engagement with keeper pin 48, or to retract locking bolt 56 inwardly out of locking engagement with keeper pin 48 so as to allow displacement of trolley 16 along tracks 36 and 37. In the light of the foregoing description of locking mechanism 44, it can be seen that locking mechanisms 44, 45 and 46 can be operated through their respective fluid motors, rods and locking bolts either to rigidly lock trolley 16 with respect to the keeper pins 48, 49, 50 of I-beams 12, 14 and 15, respectively, or to unlock trolley 16 for movement along tracks 36 and 37 within I-beams 12, 14 and 15.

As generally noted above, hydraulic power apparatus 18 comprises a fluid motor 32 mounted by a mounting plate 58 substantially centrally on the outer face of structural plate 34, a mounting plate 28 adapted to be suitably rigidly connected to the face of tube sheet 25, and a jointed rod 30 which extends from mounting plate 28, through a suitable opening in structural plate 34 into fluid motor 32 for connection to a power piston 60 reciprocably contained therein. As is avident from FIG. 3, fluid motor 32, being mounted on structural plate 34, moves with trolley 16 which locking mechanisms 44, 45 and 46 are in the unlocked position or uses I-beams 12, 14 and 15 as reaction loading elements which the trolley 16 is rigidly secured thereto by locking mechanisms 44, 45 and 46, respectively. Hydraulic fluid is provided to fluid motor 32 through hydraulic fluid lines 62 from a controlled source of hydraulic fluid (not shown).

The removal of a tube bundle from a heat exchanger by utilizing the method and apparatus of the present invention can be accomplished safely, economically and expeditiously.

Referring to the figures, a cover plate (not shown) over access opening 23 is removed from the wall 20 of heat exchanger 11 and set out of the way. Thereafter, I-beams 12, 14 and 15 are attached to the heat exchanger by welding pads 19 or in some other suitable manner. In this regard, it is to be recognized that it is within the contemplation of the present invention that mounting devices such as pads 19 can be either permanently installed on heat exchangers to be serviced, or provided on an ad hoc basis.

With the I-beams 12, 14 and 15 in place, trolley 16 is advanced, manually or otherwise, along tracks 36, 37 until mounting plate 28 can be secured to the tube sheet 25 of a tube bundle 24 to be removed. In this position, with the mounting plate rigidly fastened to tube sheet 25, trolley 16 is made fast to I-beams 12, 14 and 15 by actuating locking mechanisms 44, 45, 46 so as to displace their respective locking bolts outwardly to engage the respective keeper pins 48, 49, 50.

In that I-beams 12, 14 and 15, and trolley 16 are locked together, they are, for all practical purposes, a single structural unit. Thus, as hydraulic fluid is introduced to the left chamber of fluid motor 32, power piston 60 is displaced to the right (as seen in FIG. 3) and therewith jointed rod 30, mounting plate 28 and tube bundle 24. When sufficient hydraulic fluid has been introduced to fluid motor 32 to displace power piston 60 to the limit of its stroke, the trolley 16 is unlocked from I-beams 12, 14 and 15 by deactivating locking mechanisms 44, 45 and 46, fluid pressure is released in the left chamber of fluid motor 32 and pressurized fluid is introduced to the right chamber of fluid motor 32. The inertia of the tube bundle 24 being greater than wheeled trolley 16, the tube bundle 24 acts as a force reaction structure and trolley 16 is displaced along tracks 36 and 37 away from heat exchanger 11. Trolley 16 continues to be moved away from heat exchanger 11 until the locking bolts of locking mechanisms 44, 45 and 46 are aligned with the next outwardly adjacent set of keeper pins 48, 49, 50. At this point, trolley 16 is again locked with respect to the I-beams and thereafter fluid motor 32 is actuated to cause another incremental outward movement of tube bundle 24. This step-by-step procedure is continued until tube bundle 24 has been removed or "walked" from heat exchanger 11 by the desired amount.

It is considered to be clear that in order to replace the tube bundle within the heat exchanger, the process is merely reversed. Further, once the tube bundle has been removed or installed as desired, the tube handling apparatus 10 can be quickly removed from the heat exchanger 11 and moved to another heat exchanger for use. Such mobility is a distinct asset where many heat exchangers are to be installed and maintained.

It is to be recognized that although the method and apparatus of the present invention have been disclosed in use with respect to the utility of removing a tube bundle from a heat exchanger, they are equally useful for any equipment handling or other load handling function where it is required to pass a relatively long load substantially axially through a relatively small opening.

Those who have skill in this art will be quick to realize that many modifications and variations of the present method and apparatus are possible without departing from the scope of the invention which, as disclosed herein, is presented for the purpose of illustration and not limitation.

What is claimed is:

1. Apparatus for passing a relatively long load through a relatively small hole in a vessel comprising:
   rail means;
   trolley means mounted reciprocably within said rail means;
   locking means including reciprocable locking bolts mounted on said trolley means for positively locking said trolley means to said rail means or releasing said trolley means for movement with respect to said rail means;
   power means mounted on said trolley means for imparting axial movement of said trolley means on said rail means when said bolts are in the release position; and
   connecting means mounted between said power means and said relatively long load for imparting relative axial movement of the load relative to the trolley means in response to the actuation of said power means when the trolley means are locked to the rail means by the locking bolts.

2. Apparatus as claimed in claim 1 wherein said rail means comprises a plurality of I-beams equilaterally spaced around said opening in said vessel.

3. Apparatus as claimed in claim 2 wherein said trolley means includes rollers, for rolling on tracks mounted on at least two of said I-beams.

4. Apparatus according to claim 2 wherein each of said I-beams are provided with a plurality of spaced keeper pins mounted between their inwardly extending flanges, said locking bolts selectively engaging said keeper pins.

5. Apparatus according to claim 1 wherein said power means comprises a fluid motor, the piston of which is rigidly secured to said connecting means.

6. Apparatus according to claim 1 wherein said rail means are releasably secured to a wall of said vessel.

References Cited

UNITED STATES PATENTS

| | | |
|---|---|---|
| 3,126,103 | 3/1964 | Postlewaite et al. |
| 3,180,498 | 4/1965 | Postlewaite. |
| 3,239,077 | 3/1966 | Huff et al. |

GERALD M. FORLENZA, Primary Examiner

F. E. WERNER, Assistant Examiner

U.S. Cl. X.R.

214—1.5; 254—105